Dec. 3, 1929.　　　H. T. BEBB　　　1,738,030
BURNING RACK
Filed Nov. 2, 1928

Inventor
Harry T. Bebb
By Harry Frease
Attorney

Patented Dec. 3, 1929

1,738,030

UNITED STATES PATENT OFFICE

HARRY T. BEBB, OF CANTON, OHIO, ASSIGNOR TO THE CANTON STAMPING & ENAMELING COMPANY, OF CANTON, OHIO, A CORPORATION OF OHIO

BURNING RACK

REISSUED

Application filed November 2, 1928. Serial No. 316,686.

My invention relates to burning racks for supporting enamelware from a conveyor which transports the racks and enamelware carried thereon into and out of a kiln.

More particularly the conveyor may be a continuous conveyor, and the kiln may be a continuous or tunnel kiln.

In order that the total number of enamelware pieces burned per hour in any particular kiln be a maximum, particularly in a tunnel kiln, it is desirable that a burning rack structure and arrangement be provided which will accommodate a maximum number of enamelware pieces.

Accordingly the objects of the present improvements include the provision of a simple and easily constructed rack including a plurality of sets of self-connecting rack members, the members of each set being interchangeable one with the other, and the several sets being adapted for self-connection with each other for forming a burning rack having any desired number of tiers of ware supporting rack trays, and the tiered rack structure, thus formed being provided with means limiting swaying thereof.

Figure 1:
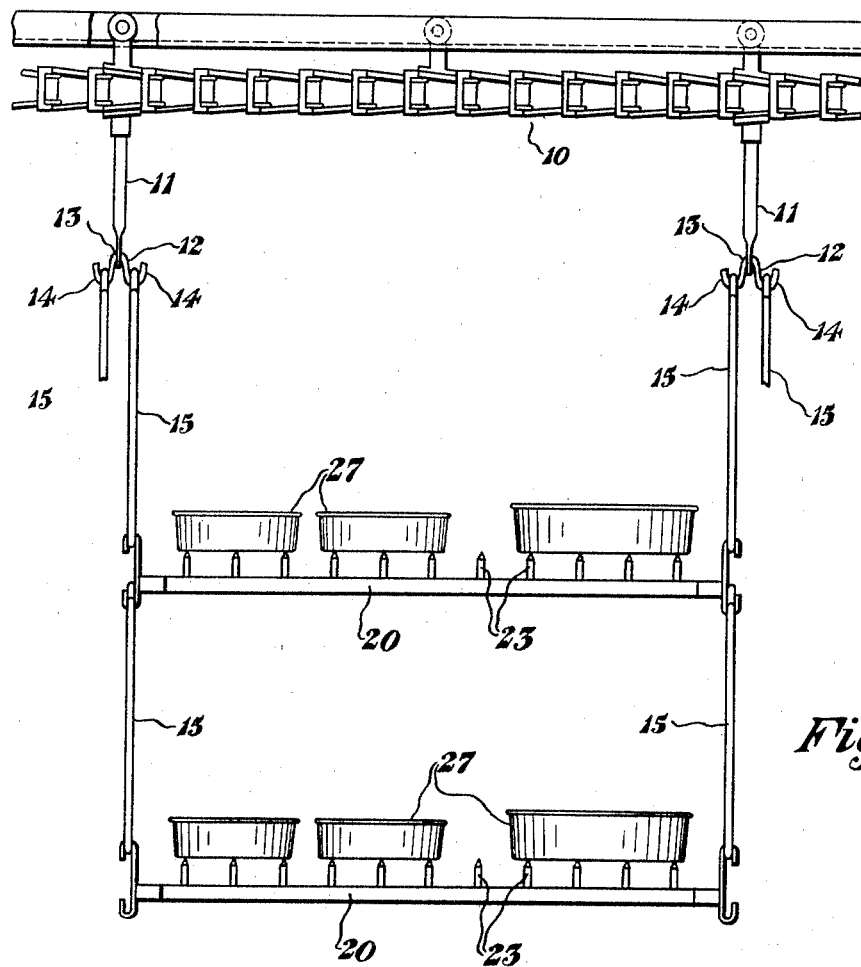
Figure 2:
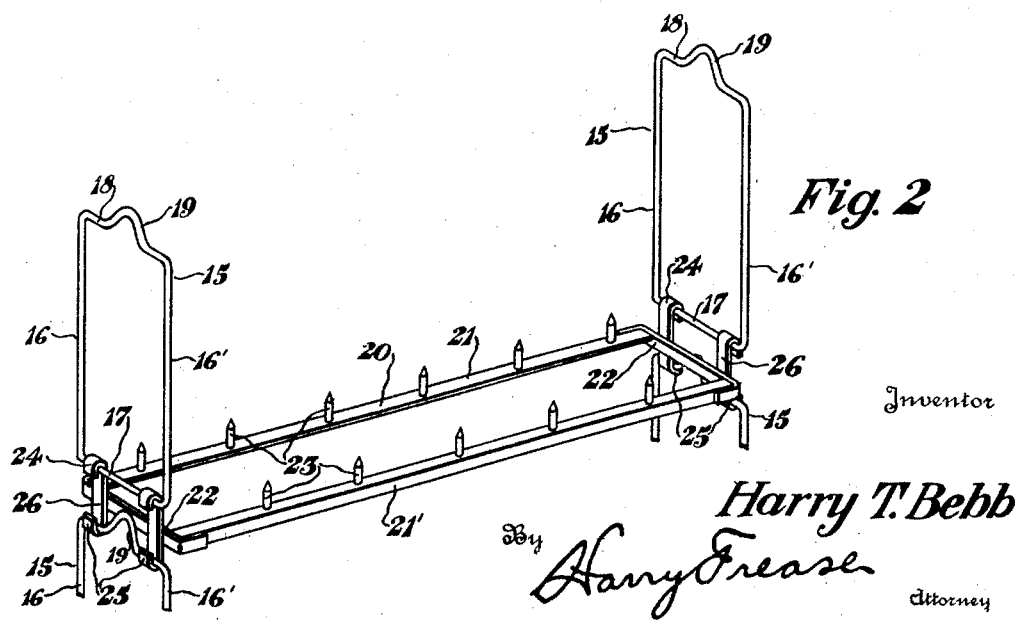

These and ancillary objects are attained in the present invention, a preferred embodiment of which is hereinafter set forth in detail, and is illustrated in the accompanying drawing forming part hereof, in which Figure 1 is a fragmentary elevation view illustrating the improved burning rack; and Fig. 2, a detached fragmentary perspective view more clearly illustrating the self-connecting members of the rack.

Similar numerals refer to similar parts throughout the drawing.

The conveyor indicated generally at 10 may be a continuous conveyor which continuously passes into and out of a continuous or tunnel kiln.

At spaced intervals, a plurality of rack supporting bars 11 may depend from the conveyor.

The improved burning rack hereof preferably includes a set of interchangeable W hooks 12, each adapted for being removably supported by its middle bend 13 in an aperture at the lower end of a supporting bar 11, so that each of the outer and upwardly opening bends 14 may be self-connected with one of another set of interchangeable rack members, that is, the depending rack tray suspending frames 15.

Each frame 15 is preferably rectangular in shape, and may be formed of wire, and includes spaced side members 16 and 16', respectively, a bottom member 17, and a top member 18.

The side and bottom members are preferably straight, and the top member 18, has preferably formed in the central portion thereof, a yoke 19 opening downwardly and extending upwardly in use; and each yoke is adapted to be self-connected with one of the upwardly opening bends 14 of a W hook for suspending a frame 15, and the yoke when used in another position is adapted for preventing swaying of the rack structure made by the several sets of rack members as will hereinafter be set forth.

The remaining set of interchangeable rack members are the rack trays 20, each of which preferably includes laterally spaced longitudinally extending angle side members 21 and 21', the ends of which are connected by end bars 22, thus forming a rectangular rack tray; and a plurality of longitudinally spaced ware supporting pins 23 extend upwardly from each of the tray side members 21 and 21'.

Spaced downwardly opening tray suspending hooks 24 are secured to each end bar 22.

Similarly, upwardly opening suspending frame supporting hooks 25 are secured to each end bar 22.

Each suspending hook 24 is preferably formed integral with a supporting hook 25 by bending the opposite ends of a vertically extending strip 26, and each strip 26 is preferably secured at its central portion upon the outer face of one of the end bars 22.

Each pair of suspending hooks 24 is adapted for self-connection with the bottom member 17 of one of the suspending frames 15, for suspending the particular tray 20 from one pair of suspending frames 15.

Each pair of supporting hooks 25 is adapted for self-connection with the outer ends of a top member 18 of another suspending frame 15, for suspending from the particular tray 20, another pair of suspending frames 15, so that another tray 20 may be suspended below the next upper tray 20.

When the frames 15 are used for suspending a tray below another tray, each upwardly extending yoke 19 is positioned opposite and adjacent an end bar 22, so that any longitudinal swaying of the tiered rack structure thus made from the several sets of rack members, is limited by abutment of one of the upwardly extending yokes 19 against the adjacent end bar 22.

For forming all of the several sets of rack members it is preferable to use a heat resisting metal. For connecting the several parts of each tray, it is preferable to employ welding, although riveting or other fastening means may be employed.

Accordingly, by a suitable selection and use of the foregoing sets of interchangeable self-connecting rack members, a tiered rack having any number of tiers of trays 20 may be suspended between each pair of opposite upwardly opening bends 14 on the W hooks 12 carried by the conveyor 10.

The enamelware indicated generally at 27 is supported in the usual manner on the pins 23, and the improved racks and enamelware supported thereon are preferably continuously transported through the kiln, not shown, by the continuous conveyor 10.

I claim:

1. A rack for supporting enamelware and the like, including a plurality of interchangeable suspending members, and a plurality of interchangeable rack trays, each suspending member and each rack tray including means separably self-engaging with the means on the other.

2. A rack for supporting enamelware and the like, including a plurality of interchangeable suspending members, a plurality of interchangeable rack trays, and means on each end of each suspending member for selective separable self-engagement with means on an end of a tray.

3. A rack for supporting enamelware and the like, including a plurality of interchangeable suspending members, a plurality of interchangeable rack trays, means on each tray for suspending engagement with an upper suspending member, and means on each tray for supporting engagement with lower suspending member.

4. A rack for supporting enamelware and the like, including a plurality of interchangeable suspending members, and a plurality of interchangeable rack members, each member including means separably self-engaging with the means on the other, and one of the members including a stop for limiting relative movement between the members.

In testimony that I claim the above I have hereunto subscribed my name.

HARRY T. BEBB.